United States Patent [19]

Mock

[11] 4,404,882
[45] Sep. 20, 1983

[54] METHOD AND APPARATUS FOR TRIMMING ELONGATED ARTICLES

[75] Inventor: George E. Mock, Duluth, Ga.

[73] Assignee: Western Electric Company, Inc., New York, N.Y.

[21] Appl. No.: 290,279

[22] Filed: Aug. 6, 1981

[51] Int. Cl.³ ............................................. B23D 1/26
[52] U.S. Cl. ..................................... 83/869; 83/49; 409/303
[58] Field of Search ............... 83/869, 49, 875, 302, 83/41; 409/293, 298, 303, 319; 144/124, 120

[56] References Cited

U.S. PATENT DOCUMENTS

| | | | |
|---|---|---|---|
| 1,455,342 | 5/1923 | Langston | 83/41 |
| 2,744,451 | 5/1956 | Lee | 409/293 |
| 3,254,568 | 6/1966 | Pickard | 409/303 |
| 3,437,008 | 4/1969 | Persson | 409/298 |
| 3,691,888 | 9/1972 | Brandon | 83/302 |
| 3,715,943 | 2/1973 | Hirai et al. | 83/41 X |
| 3,964,356 | 6/1976 | Dineen | 83/302 |
| 3,972,215 | 8/1976 | Elkins | 83/49 X |
| 4,344,342 | 8/1982 | Garvin | 83/49 X |

Primary Examiner—Frank T. Yost
Attorney, Agent, or Firm—David P. Kelley

[57] ABSTRACT

A method and apparatus for trimming an elongated article are disclosed by which the article is notched at longitudinally spaced locations and material spanning adjacent notches trimmed from the article as discrete strips.

5 Claims, 5 Drawing Figures

METHOD AND APPARATUS FOR TRIMMING ELONGATED ARTICLES

TECHNICAL FIELD

This invention relates to methods and apparatuses for trimming elongated articles.

BACKGROUND OF THE INVENTION

In the continuous trimming of elongated articles small strips of scrap material trimmed from the articles tend to be themselves continuous and elongated. With many materials, however, the strips periodically segment themselves due to their own size, shape, weight and brittleness. With other materials, though, the continuous trimmings or strips do not self-break and segment. In such cases manual or machine segmentation may be required to facilitate handling and deposition of the long, continuous strips. For example, chip breakers are often mounted to lathes to coil work-hardened, scrap metal trimmed from workpieces until they crack and segment. In other cases, as in the textile industry, fibrous trimmings are automatically segmented by cutters.

The fabrication of metal bars is another industrial manufacturing process that often requires a trimming operation. For example, in casting copper bars from molten copper, flashing is often formed extending from corners of the bars. Furthermore, due to the fact that the bar material forming the sharp corners of cast bars tends to cool quicker than the rest of the bar material, poor grain structure is often produced at such corners. This can, in turn, be the cause of breaks occurring as where the bar is reduced in size and drawn into wire. Thus bar corners too, particularly those forming acute angles which give rise to significantly more rapid cooling than the rest of the bar, are also often trimmed.

Heretofore, cast copper bars have been trimmed by advancing the bars supported on rollers through a cutting station where one or more blades are fixedly positioned to trim one or more surface or corners of the bars. This is typically done while the copper is still at an elevated temperature from the casting operation. The strips of materials trimmed from the bar then curl aside of the advancing bar and onto the adjacent floor or into a disposal chute. Being continuous the strips must be periodically segmented to facilitate handling. This has been done manually by workmen with the use of long rods struck against the hot strips and this continuous use of manpower has proved to be both costly and risky.

SUMMARY OF THE INVENTION

In one form of the invention an elongated article being advanced along a path is trimmed by the steps of periodically moving a first blade into and out of contact with the article so as to form spaced notches therein, and directing the notched elongated article into contact with a second blade so as to trim discrete strips spanning adjacent notches sequentially from the elongated article.

In another preferred form of the invention apparatus for trimming an elongated article being advanced along a path comprises a first blade mounted for periodic movement into and out of contact with the article so as to form spaced notches therein, and a second blade mounted downline from said first blade in position to trim discrete strips spanning adjacent notches sequentially from the elongated article.

DETAILED DESCRIPTION

Figure 1:
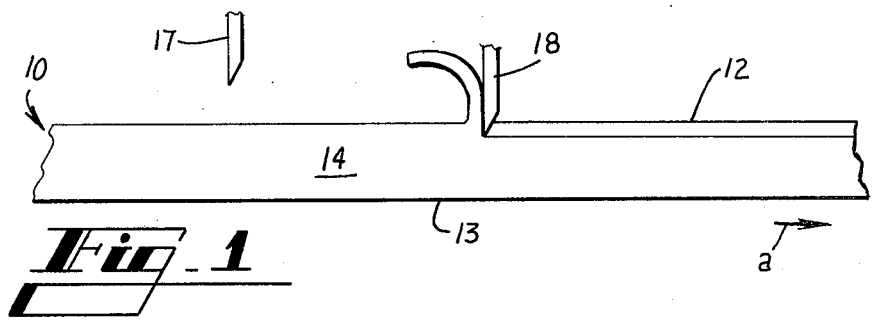
FIGS. 1-4 are side elevational views of a bar being trimmed in accordance with principles of the invention.
Figure 2:
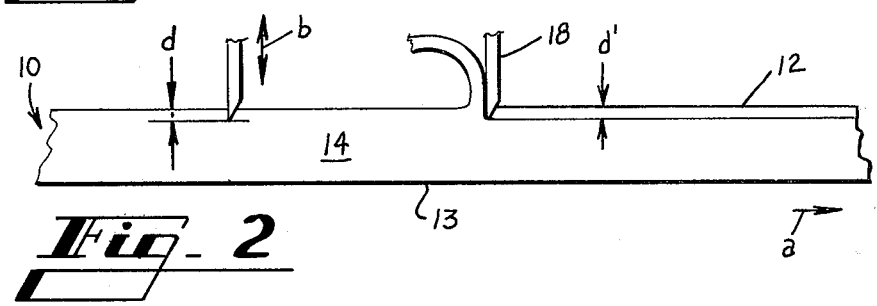
Figure 3:
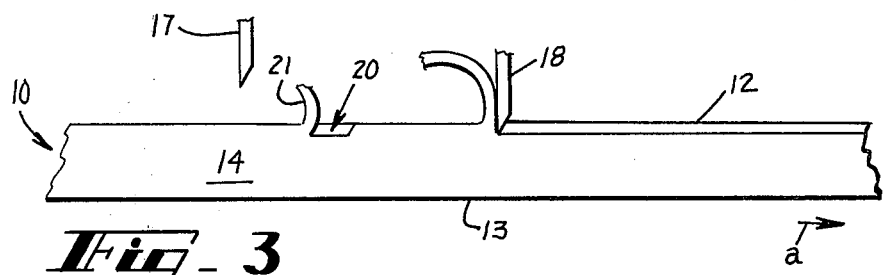
Figure 4:
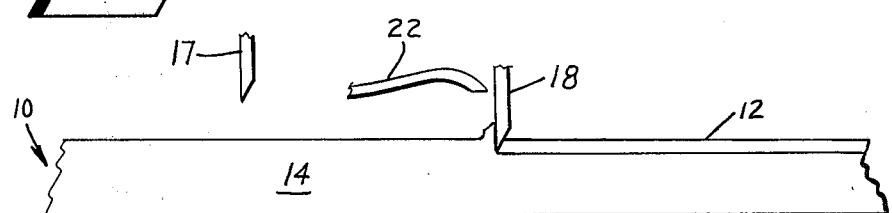

With reference next to the drawing a copper bar 10 is illustrated being trimmed in accordance with the present invention. The bar is seen to be of trapezoidal cross-sectional shape having a planar upper surface 12, a planar lower surface 13 and two canted side surfaces 14. The bar here is moving from left to right in FIGS. 1-4 as indicated by arrows a at a line speed of 60 feet/minute. Having just been cast it is at a temperature of some 1300° F.

Figure 5:
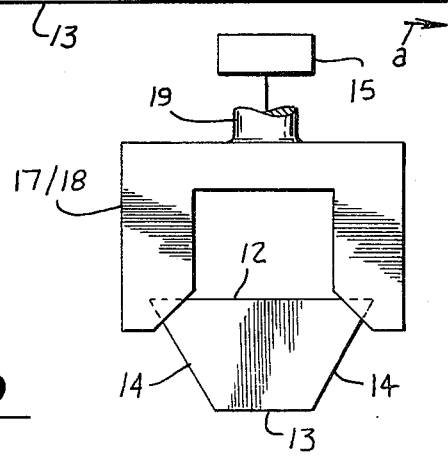
FIG. 5 is an end view of the bar and rear elevational view of a trimming blade illustrated in FIGS. 1-4.

The trimming operation is made to remove the elongated two upper corners of the bar and any flashing extending therefrom. This is done by cyclically moving a blade 17 into and out of contact with the two upper corners of the bar as indicated by arrows b with the use of a reciprocating drive means 15, coupled with blade shaft 19, such as an air driven piston. The blade here is of the shape shown in FIG. 5 and of a steel base composition with two tungston-carbide inserts (not shown) brazed thereto. The blade is operated at full cycle intervals of 3 seconds with a bar contact time of ¼ seconds so as to form notches 20 measuring some 3 inches in nominal lengths each per minute. As the blade 17 rises a curl 21, of somewhat less than 3 inches length due to compacting against the leading surface of blade 17, remains protruding away from the bar and notch.

Next the bar is advanced into trimming engagement with a trimming blade 18 located downline from the blade 17. This blade, which is of the same shape and composition as blade 17, is fixedly positioned to trim the same or slightly less material from the bar corners as that trimmed by the blade 17 in forming the notches 20. In other words, the depth d' of the cut made by blade 18 is equal to or slightly less than the notch depth d made by blade 17. This is done to insure complete segmentation of the trimmed strips each time a notch reaches the fixed blade 18. With this particular arrangement segments measuring 3 feet in length are trimmed from the bar at the rate of 20 segments per minute.

It should be understood that the just described embodiment merely illustrates principles of the invention in one preferred form. Many modification, additions and deletions may, of course, be made thereto without departure from the spirit and scope of the invention as set forth in the following claims.

What is claimed is:

1. A method of trimming a cast metal bar of a shape having at least one elongated corner as it is being advanced along a path which method comprises the steps of periodically moving a first blade into and out of the corner of the bar thereby forming spaced notches in the corner from which curls protrude, and directing the notched metal bar corner into contact with a second blade to trim discrete corner strips spanning adjacent notches sequentially from the bar.

2. The bar trimming method of claim 1 wherein the first blade is moved into the bar corner to a first depth and wherein the notched metal bar corner is directed into contact with the second blade to a depth equal to or less than the first depth.

3. Apparatus for trimming a cast metal bar of a shape having at least one elongated corner as it is being advanced along a path comprising a first blade mounted for periodic movement into and out of contact with the bar corner so as to form spaced notches therein, and a second blade mounted downline from said first blade in position to trim the corner continuously from the bar whereby the first and second blades cooperate to trim a succession of discrete strips spanning adjacent notches sequentially from the bar.

4. Bar trimming apparatus in accordance with claim 3 wherein said first and second blades are substantially parallel.

5. Bar trimming apparatus in accordance with claim 3 wherein said first and second blades are substantially of the sam size and shape.

* * * * *